(12) United States Patent
Cao et al.

(10) Patent No.: US 9,804,439 B2
(45) Date of Patent: Oct. 31, 2017

(54) DISPLAY PANEL AND A DISPLAY DEVICE (71) Applicants: Shanghai Tianma Micro-electronics Co., Ltd., Shanghai (CN); Tianma Micro-electronics Co., Ltd., Shenzhen (CN)

(72) Inventors: Zhaokeng Cao, Shanghai (CN); Zhongshou Huang, Shanghai (CN); Long Zhang, Xiamen (CN)

(73) Assignees: SHANGHAI TIANMA MICRO-ELECTRONICS CO., LTD, Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 9 days.

(21) Appl. No.: 15/044,205

(22) Filed: Feb. 16, 2016

(65) Prior Publication Data
US 2016/0238891 A1  Aug. 18, 2016

(30) Foreign Application Priority Data

Feb. 13, 2015 (CN) .......................... 2015 1 0076358

(51) Int. Cl.
G02F 1/1335 (2006.01)
G02F 1/1343 (2006.01)

(52) U.S. Cl.
CPC .. G02F 1/133528 (2013.01); G02F 1/134363 (2013.01); *G02F 2001/133531* (2013.01); *G02F 2001/133538* (2013.01)

(58) Field of Classification Search
CPC ......... G02F 1/133528; G02F 1/134363; G02F 2001/133538; G02F 2001/133531; G02B 5/30; G02B 27/28
See application file for complete search history.

(56) References Cited

U.S. PATENT DOCUMENTS

2006/0139574 A1* 6/2006 Ralli ...................... G02B 5/305
                                                                353/20
2008/0170183 A1* 7/2008 Sugiyama .......... G02B 27/2214
                                                                349/96

(Continued)

FOREIGN PATENT DOCUMENTS

CN        1716055 A      1/2006
CN      101726925 A      6/2010

(Continued)

*Primary Examiner* — Paul Lee
*Assistant Examiner* — Mariam Qureshi
(74) *Attorney, Agent, or Firm* — Anova Law Group, PLLC (57) ABSTRACT A liquid crystal display panel includes: a first polarization layer, a second polarization layer, and a liquid crystal layer located between the two polarization layers. Liquid crystal molecules in the liquid crystal layer are initially aligned along a first direction. At least one first region and at least one second region are defined in the first polarization layer and the second polarization layer. In the first region, the absorption axis of the first polarization layer extends along the first direction while the absorption axis of the second polarization layer is perpendicular to the first direction. In the second region, the absorption axis of the first polarization layer extends along a second direction while the absorption axis of the second polarization layer is perpendicular to the second direction. A first angle formed by the second direction and the first direction is greater than 0 degree but less than 90 degrees.

19 Claims, 6 Drawing Sheets (56) References Cited

U.S. PATENT DOCUMENTS

| | | | | |
|---|---|---|---|---|
| 2010/0208176 A1* | 8/2010 | Ge | ................... | G02F 1/133555 349/98 |
| 2011/0141127 A1* | 6/2011 | Chang | ................ | G02F 1/13306 345/581 |
| 2011/0242468 A1* | 10/2011 | Choi | ........................ | C08G 8/12 349/129 |
| 2013/0120676 A1* | 5/2013 | Iwahashi | .................. | B41M 3/06 349/15 |
| 2014/0118665 A1* | 5/2014 | Miyazaki | .......... | G02F 1/133536 349/96 |

FOREIGN PATENT DOCUMENTS

| | | |
|---|---|---|
| CN | 104122703 A | 10/2014 |
| CN | 104220965 A | 12/2014 |
| EP | 0525478 A2 | 2/1993 |

\* cited by examiner

DISPLAY PANEL AND A DISPLAY DEVICE

CROSS-REFERENCES TO RELATED APPLICATIONS

This application claims the priority of Chinese patent application No. 201510076358.7, filed on Feb. 13, 2015, the entirety of which is incorporated herein by reference.

FIELD OF THE INVENTION

The present invention generally relates to the planar display technology and, more particularly, relates to a liquid crystal display panel and a liquid crystal display device containing the liquid crystal display panel.

BACKGROUND

With a number of advantages such as light weight, small thickness, low power consumption, etc., liquid crystal display has been widely used in televisions, cell phones, monitors, and other electronic products.

Currently, because of a relatively simple manufacturing process, liquid crystal display (LCD) monitors operating in a twisted nematic (TN) mode have been extensively used. However, the view angle of liquid crystal monitor using the TN mode is relatively small. To increase the view angle, in-plane switching (IPS) type liquid crystal monitors have been developed. A current IPS type liquid crystal monitors may have view angles from up direction, down direction, left direction, and right direction all greater than 85 degrees without grayscale inversion nor color shift, demonstrating excellent performance. However, the response speed of the IPS type liquid crystal monitors is relatively slow, thus limiting further applications of such liquid crystal monitors.

The disclosed LCD panels and LCD display devices are directed to solve one or more problems set forth above and other problems.

BRIEF SUMMARY OF THE DISCLOSURE

One aspect of the present disclosure provides a liquid crystal display panel. The liquid crystal display panel includes a first polarization layer, a second polarization layer arranged corresponding to the first polarization layer, and a liquid crystal layer located between the first polarization layer and the second polarization layer. The initial alignment direction of the liquid crystal molecules in the liquid crystal layer is along a first direction. At least one first region and at least one second region are defined in the first polarization layer and the second polarization layer. In the first region, the absorption axis of the first polarization layer extends along the first direction while the absorption axis of the second polarization layer is perpendicular to the first direction. In the second region, the absorption axis of the first polarization layer extends along a second direction while the absorption axis of the second polarization layer is perpendicular to the second direction. A first angle formed by the second direction and the first direction is greater than 0 degree but less than 90 degrees.

The present disclosure also provides another liquid crystal display panel. The display panel includes a first polarization layer, a second polarization layer arranged corresponding to the first polarization layer, and a liquid crystal layer located between the first polarization layer and the second polarization layer. The initial alignment direction of the liquid crystal molecules in the liquid crystal layer is along a first direction. At least one first region and at least one second region are defined in the first polarization layer and the second polarization layer. In the first region, the absorption axis of the first polarization layer extends along a second direction while the absorption axis of the second polarization layer is perpendicular to the second direction. A first angle formed by the first direction and the second direction is greater than 0 degree but less than 90 degrees. In the second region, the absorption axis of the first polarization layer extends along a third direction while the absorption axis of the second polarization layer is perpendicular to the third direction. A second angle formed by the third direction and the second direction is greater than 0 degree but less than 90 degrees.

Another aspect of the present disclosure further provides a display device. The display device includes a display panel described in the present disclosure.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
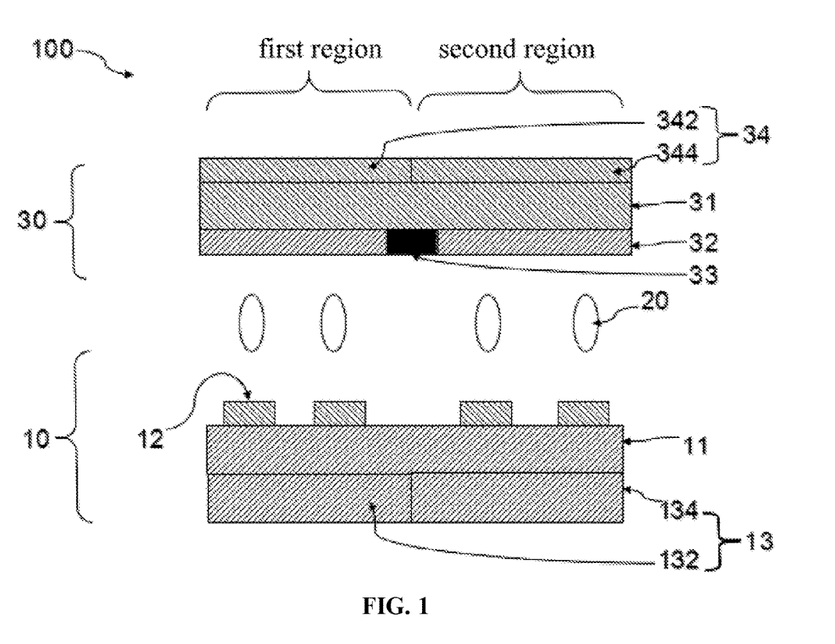
FIG. 1 illustrates a schematic cross-section view of a liquid crystal display panel consistent with disclosed embodiments.

FIG. 1 shows a schematic structure view of a liquid crystal display panel consistent with one embodiment of the present disclosure. Referring to FIG. 1, the liquid crystal display panel 100 includes a thin-film transistor (TFT) substrate 10, a color film substrate 30 arranged corresponding to the TFT substrate, and a liquid crystal layer 20 located between the TFT substrate 10 and the color film substrate 30. Other components may also be included.

The structure and the type of the liquid crystal display panel 100 are not limited to any specific type. For example, the liquid crystal display panel 100 may be a Fringe Field Switching (FFS) type, an In-Plane Switching (IPS) type, or any other type. In one embodiment, the liquid crystal display panel 100 is an FFS type liquid crystal display panel. The pixel structure of the liquid crystal display panel 100 is also not limited to any specific type and it can be single domain, double domain, or pseudo-double domain. In one embodiment, the pixel structure of the liquid crystal display panel 100 is a single domain type.

The TFT array substrate 10 may include a first substrate 11, a number of electrodes 12, and a first polarization layer 13. The electrodes 12 are arranged in parallel and spaced on the surface of the first substrate 11 close to the liquid crystal layer 20. The electrodes 12 include a number of pixel electrodes and a number of common electrodes. The plurality of electrodes 12 are arranged in parallel with each other and extend along a direction D5 (not shown). The first polarization layer 13 is arranged on the far-side surface of the first substrate 11 away from the liquid crystal layer 20.

The liquid crystal layer 20 is arranged between the TFT array substrate 10 and the color film substrate 30. The liquid crystal layer 20 may be made of any appropriate liquid crystal material with a positive or a negative dielectric anisotropy. The liquid crystal molecules in the liquid crystal layer 20 are initially aligned along a direction D1 (not shown). That is, the initial alignment direction of the liquid crystal molecules in the liquid crystal layer 20 extends along the direction D1. In one embodiment, the liquid crystal molecules in the liquid crystal layer 20 have a positive dielectric anisotropy. The initial alignment direction D1 of the positive liquid crystals has a first angle with respect to the extending direction D5 of the electrodes 12 and the first angle is greater than 0 degree but less than or equal to 15 degrees.

The color film substrate 30 includes a second substrate 31, a number of color barriers 32, a black matrix 33, and a second polarization layer 34. The plurality of color barriers 32 are arranged on the surface of the second substrate 31 close to the liquid crystal layer 20. The second polarization layer 34 is arranged on the far-side surface of the second substrate 31 away from the liquid crystal layer 20. The black matrix 33 is arranged in between multiple color barriers 32.

Figure 2:
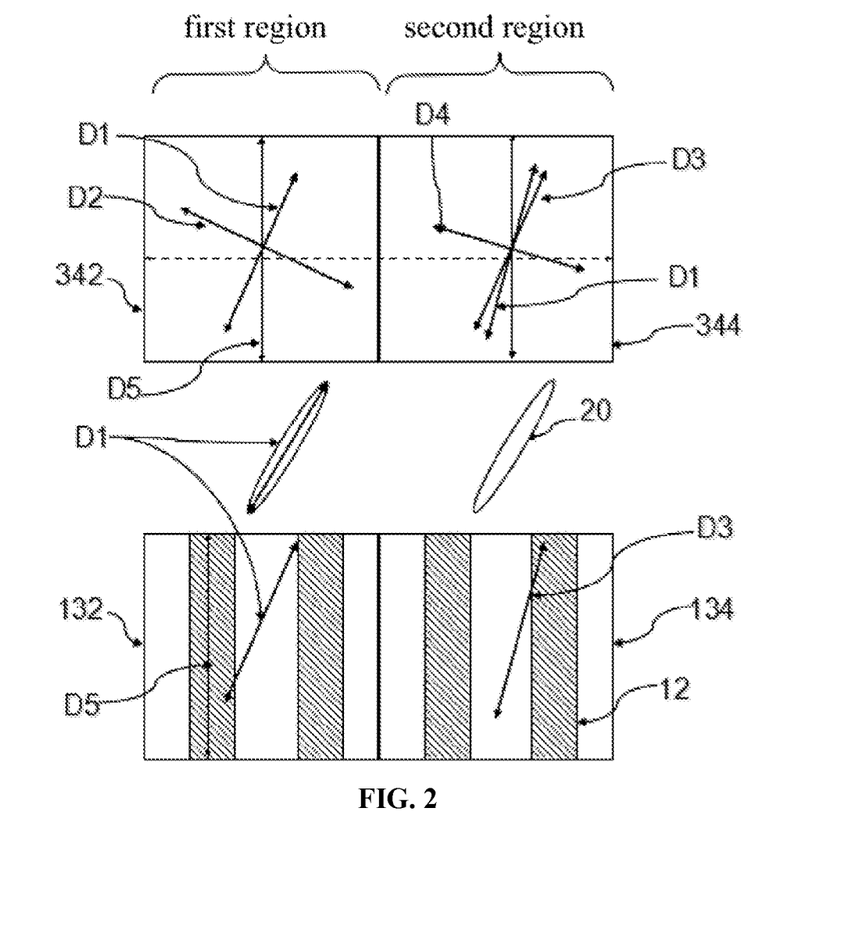
FIG. 2 illustrates a schematic view of the polarization directions of different regions of the polarization layers in the liquid crystal display panel shown in FIG. 1.

FIG. 2 shows a schematic view of the polarization directions of the polarization layers in the display panel shown in FIG. 1. Referring to FIG. 1 and FIG. 2, each of the first polarization layer 13 and the second polarization layer 34 may be a regionalized polarizer. The regionalized polarizer has at least one region having a polarization direction different from the polarization direction of other regions of the regionalized polarizer.

Specifically, at least one first region and at least one second region are defined in each of the first polarization layer 13 and the second polarization layer 34. Each first region and each second region may individually correspond to one pixel or one subpixel. In the first region, the first polarization layer 13 and the second polarization layer 34 have a first polarization region 132 and a second polarization region 342, respectively. In the second region, the first polarization layer 13 and the second polarization layer 34 have a third polarization region 134 and a fourth polarization region 344, respectively. The polarization direction of the first polarization region 132 is different from the polarization direction of the second polarization region 342; while the polarization direction of the third polarization region 134 is different from the polarization direction of the fourth polarization region 344.

The absorption axis of the first polarization region 132 extends along the direction D1. That is, the absorption axis of the first polarization region 132 coincides with the initial alignment direction D1 of the liquid crystal molecules. The absorption axis of the second polarization region 342 extends along a direction D2. The direction D1 and the direction D2 are perpendicular to each other.

The absorption axis of the third polarization region 134 extends along a direction D3. The direction D3 forms a second angle and a third angle with the direction D1 and the direction D5, respectively. The second angle and the third angle are both greater than 0 degree and less than 90 degrees. The absorption axis of the fourth polarization region 344 extends along a direction D4. The direction D3 and the direction D4 are perpendicular to each other.

With respect to response speed of liquid crystal display devices, the response speed and the driving voltage applied on a liquid crystal display device may satisfy the following relationship:

$$\tau_{ON} = \frac{\gamma_1 d^2}{\varepsilon_0 \Delta\varepsilon (V^2 - V_{TH}^2)} \quad (1)$$

$$\tau_{OFF} = \frac{\gamma_1 d^2}{\pi^2 K} \quad (2)$$

where $\tau_{ON}$ is the rise time, usually referring to the time during which the brightness of the liquid crystal display device increases from 10% (dark mode) of the maximum brightness to 90% (bright mode) of the maximum brightness; $\tau_{OFF}$ is the fall time, usually referring to the time during which the brightness of the liquid crystal display device changes from the bright mode to the dark mode; V is the driving voltage of the liquid crystal display device; $\gamma_1$ is the rotation viscosity coefficient of the liquid crystal; $\varepsilon_0$ is vacuum dielectric constant; $\Delta_\varepsilon$ is the dielectric anisotropy constant; $V_{TH}$ is the threshold voltage; K is the effective elastic constant; d is the thickness of the liquid crystal layer in the liquid crystal display device.

As indicated by the formula (1), the rise time of the liquid crystal display device decreases as the driving voltage increases. However, as indicated by the formula (2), the fall time does not depend on the driving voltage. The response time of a liquid crystal display device is the sum of the rise time and the fall time and, therefore, a relatively effective method to decrease the response time is to decrease the rise time by increasing the driving voltage.

However, in current existing liquid crystal display device, the alignment direction of the liquid crystal molecules coincides with at least one of the absorption axes of two polarization layers, thus the initial state of the liquid crystal display device is set to the dark mode. The driving voltage to switch the device from the dark mode to the bright mode is limited within a relatively narrow voltage range. Therefore, the method to reduce the rise time by increasing the driving voltage is technically difficult.

In the present embodiment, the third angle formed by the direction D3 and the direction D5 is further set to be greater than the first angle. Because the direction D3 of the absorption axis of the third polarization region 134 of the first polarization layer 13 is different from the initial alignment direction D1 of the liquid crystal molecules, and the third angle formed by the direction D3 of the absorption axis of the third polarization region 134 and the extending direction D5 of the electrodes 12 is greater than the first angle formed by the initial alignment direction D1 of the liquid crystal molecules and the extending direction D5 of the electrodes 12, the initial state of the entire second region is not set to the dark mode. Therefore, a preset voltage $V_0$ is required to be applied on the electrodes 12 in the entire second region in order to drive the second region into the dark mode. Further, in addition to the preset voltage $V_0$, an extra driving voltage V may be applied on the electrodes 12 to drive the second region into the bright mode. That is, the driving voltage of the second region is $V_0$+V. Therefore, the second region of the liquid crystal display panel 100 has a relatively large driving voltage, thus the rise time may be reduced, leading to an improved response speed.

Moreover, in the first region, because the direction of the absorption axis of the first polarization region 132 coincides with the initial alignment direction D1 of the liquid crystal molecules, the initial state of the first region is the dark mode and no additional preset voltage $V_0$ is required. That is, the driving voltage of the first region is V. Therefore, the rise time and the response speed remain unchanged.

In certain other embodiments, the direction of the absorption axis of the first polarization region 132 may be set to have a preset angle with respect to the initial alignment direction D1 of the liquid crystal molecules so that the initial state of the first region is not the dark mode. Further, by applying a preset voltage $V_0'$ on the electrodes 12, the response speed of the first region may be improved.

Specifically, in another embodiment, a liquid crystal display panel (not shown) may be the same as the display panel described above, except that the absorption axis of the first polarization layer in the first region extends along a different direction from the initial polarization direction of the liquid crystal molecules in the liquid crystal layer of the display panel. Thus, the initial polarization direction of the liquid crystal molecules is along a first direction; while the absorption axis of the first polarization layer in the first region extends along a second direction.

A first angle formed by the first direction and the second direction is greater than 0 degree but smaller than 90 degrees. The absorption axis of the second polarization layer in the first region is perpendicular to the absorption axis of the first polarization layer in the first region. In the second region, the absorption axis of the first polarization layer extends along a third direction. The angle formed by the third direction and the second direction is defined as a second angle and it is greater than 0 degree but less than 90 degrees. In the second region, the absorption axis of the second polarization layer is perpendicular to the absorption axis of the first polarization layer.

Further, a preset voltage is required for both the first region and the second region in order to drive them into the dark mode. Further, in addition to the preset voltage, an extra driving voltage may be applied to drive either one of the first region and the second region into the bright mode. Therefore, both the first region and the second region of the liquid crystal display panel have a relatively large driving voltage, thus the rise time may be reduced, leading to an improved response speed for both regions.

The regionalized polarizers may include a base material and a polarizing material. The polarizing material may be doped into the base material. The base material may be one or more of cellulose triacetate, polyimide, polyamide acid, etc. The base material may have excellent photo-alignment properties. Under irradiation of polarized ultraviolet light, the base material may take a certain direction, correspondingly, the direction of the polarizing material also changes, and a certain alignment direction is then achieved.

The polarizing material may include a dichroic organic dye with a dichroic ratio greater of equal to 7. The dichroic organic dye may be one or more of azo dye, anthraquinone dye, biphenyl dye, triphenyl dioxazine dye and derivatives, single-methine dye, multi-methine dye, poly ring dye, etc. The dichroic organic dye can be aligned under irradiation of polarized ultraviolet light. In addition, because of the dichroic property of these dichroic organic dyes, only light with a certain polarization direction is transmitted under the irradiation of natural light, while the light with the other polarization direction is blocked; therefore, these dichroic organic dyes may function as polarizer.

The structure of azo dichroic organic dye may be:

Further, by introducing appropriate electron donating/attracting groups to the end of the molecules of azo dichroic organic dye, the difference in the polarization directions of different regions of a polarizer may be defined more accurately. Therefore, the accuracy of the regionalized polarizer is improved and the stability of the polarizer is also improved. The reason for this improvement might be that, by introducing the electron donating/attracting groups, the dichroic properties of the material are improved.

Moreover, the polarizing material may further include materials with a structure of benzidine, diphenyl urea, stilbene, two naphthylamine, J-acid, or anthraquinone.

Figure 3:
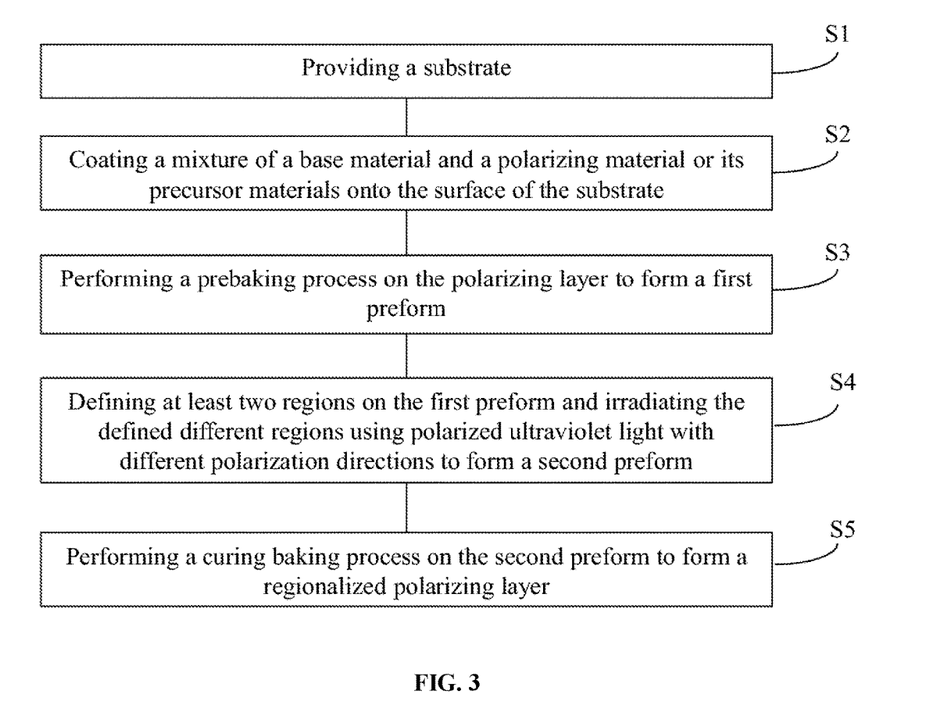
FIG. 3 illustrates a flowchart of an exemplary method for fabricating a regionalized polarization layer of liquid crystal display panel consistent with disclosed embodiments.

FIG. 3 illustrates a flowchart of an exemplary method for fabricating a regionalized polarization layer in the liquid crystal display panel consistent with disclosed embodiments. Referring to FIG. 3, the regionalized polarization layer may be formed by the following fabrication procedures:

Step S1: providing a substrate. The substrate may be made of any appropriate material, such as quartz, glass, or resin.

Step S2: coating a mixture of the base material and the polarizing material or its precursor material onto the surface of the substrate. The mixture may be coated by a spin-coating method.

In one embodiment, a mixture of polyimide and azo dye is coated on the substrate.

Step S3: prebaking the polarization layer to form a first preform.

Specifically, the prebaking temperature may be in a range of 90° C.~130° C. and the prebaking time may be in a range of 60 s~120 s. In one embodiment, the prebaking temperature is about 130° C., while the prebaking time is about 120 s.

Step S4: Defining at least two regions on the first preform and irradiating the defined different regions using polarized ultraviolet light with different polarization directions to form a second preform;

Irradiating the first preform with polarized ultraviolet light may let the polarizing material and/or the base material aligned along certain direction. The energy of the polarized ultraviolet light may be in a range of 300 mJ~1000 mJ. In one embodiment, the energy of the polarized ultraviolet light is selected to be in a range of 500 mJ~800 mJ. Using this irradiation energy, the photo-alignment properties of polyimide films may be desired. Thus, the irradiation energy helps the alignment of the azo dye, and desired polarization performance may be achieved.

Figure 4:
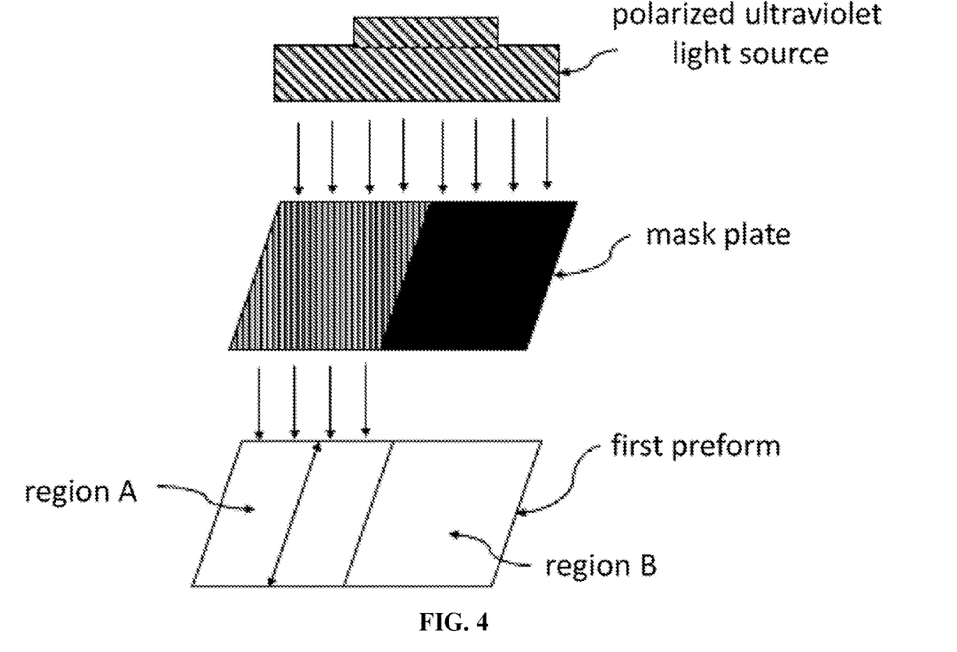
FIG. 4 illustrates a processing diagram of the irradiation process for fabricating a regionalized polarization layer consistent with disclosed embodiments.

FIG. 4 shows a schematic diagram of the irradiating process for fabricating a regionalized polarization layer consistent with disclosed embodiments. Referring to FIG. 4, the first preform may have a region A and a region B, and may be placed under a polarized ultraviolet light source. A mask plate for the irradiating process may be placed between the polarized ultraviolet light source and the first preform.

During the irradiating process, first, the polarized ultraviolet light source and the mask plate are provided. The polarized ultraviolet light source can generate ultraviolet light polarized along the first polarization direction. The mask plate has at least one transparent area and one light-shielding area.

Then, region B of the first preform is shielded by the shielding area of the mask plate while region A of the first preform is exposed through the transparent area of the mask plate. Further, the polarized ultraviolet light source is used to irradiate the exposed region A so that region A of the first preform is aligned. The first preform is then rotated by a certain angle so that the desired second polarization direction of the regionalized polarization layer to be formed now coincides with the polarization direction of the ultraviolet light. In the meantime, the shielding area of the mask plate is changed to cover region A of the first preform while the transparent area of the mask plate is used to expose region B of the first preform. Finally, the polarized ultraviolet light source is used to irradiate the exposed region B so that region B of the first preform is aligned along the second polarization direction.

Returning to FIG. 3, the irradiating process further includes Step S5: curing baking the second preform to form the regionalized polarization layer.

The curing baking temperature may be in a range of 210° C.~230° C. and the curing baking time may be in a range of 20 min~50 min. In one embodiment, the curing baking temperature is about 230° C., while the curing baking time is about 30 min.

Further, liquid crystal display panels using regionalized polarization layers of the present disclosure may also realize 3D display functions.

The present disclosure further provides a display device containing the liquid crystal display panel 100 described above.

Figure 5:
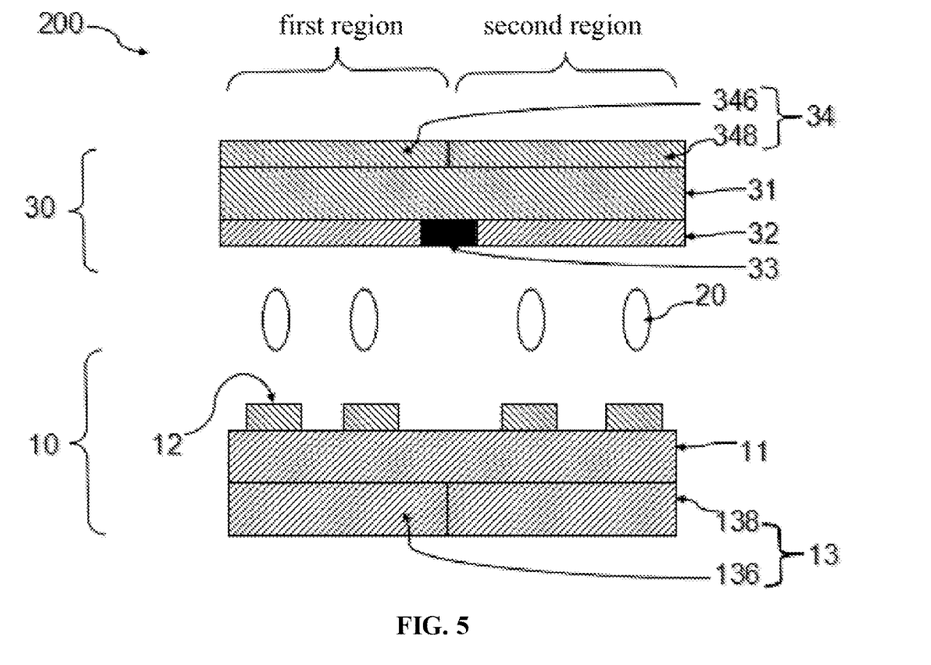
FIG. 5 illustrates a schematic cross-section view of the structure of a display panel consistent with disclosed embodiments.
Figure 6:
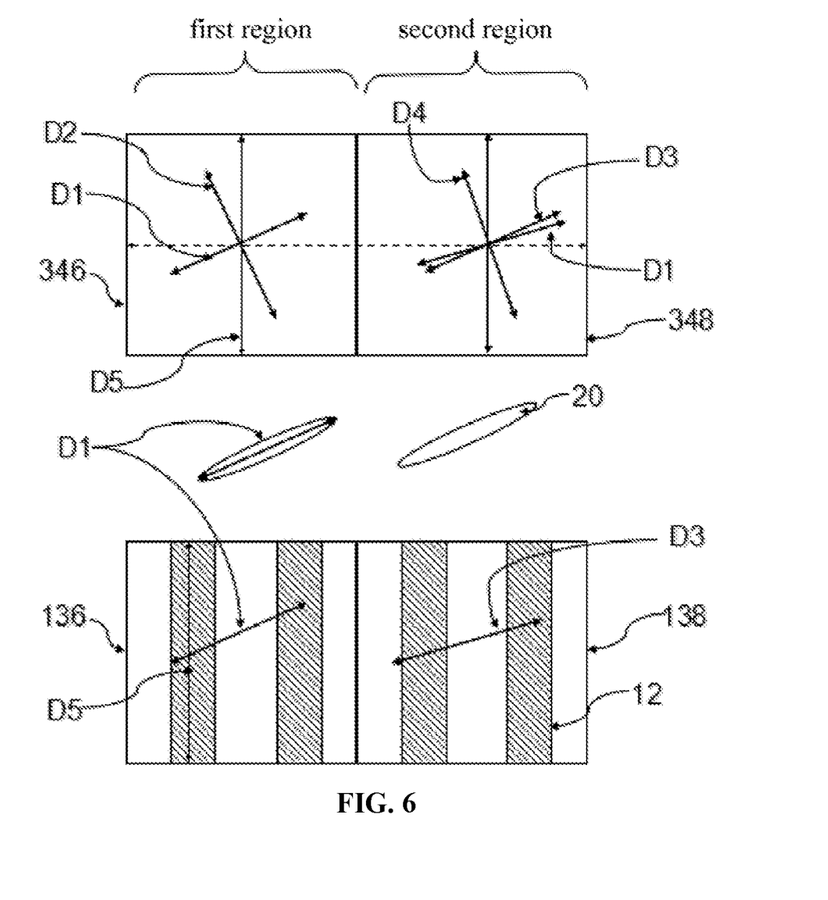
FIG. 6 illustrates a schematic view of the polarization directions of different regions of the polarization layers in the display panel shown in FIG. 5.

The present disclosure also provides another exemplary display panel. FIG. 5 shows a schematic cross-section view of the structure of a display panel consistent with another embodiment of the present disclosure. FIG. 6 shows a schematic view of the polarization directions of different regions of the polarization layers in the display panel shown in FIG. 5.

Referring to FIG. 5 and FIG. 6, the liquid crystal display panel 200 in the present embodiment is substantially the same as the display panel 100 shown in FIG. 1 and FIG. 2, except that the liquid crystal molecules in the liquid crystal layer 20 of the display panel 200 have a negative dielectric anisotropy, and the polarization directions of the first polarization layer 13 and the second polarization layer 34 in the first region and the second region are different.

Specifically, referring to FIG. 6, a first angle formed by an initial alignment direction D1 of the negative liquid crystals and an extending direction D5 of electrodes 12 is greater than 75 degrees but less than or equal to 90 degrees. The absorption axis of a first polarization region 136 coincides with the initial alignment direction D1 of the liquid crystal molecules. The absorption axis of a second polarization region 346 extends along a direction D2. The direction D1 and the direction D2 are perpendicular to each other.

The absorption axis of a third polarization region 138 extends along a direction D3. The direction D3 forms a second angle and a third angle with the direction D1 and the direction D5, respectively. The second angle and the third angle are both greater than 0 degree and less than 90 degrees. The absorption axis of a fourth polarization region 348 extends along a direction D4. The direction D3 and the direction D4 are perpendicular to each other. In the meantime, the third angle formed by the direction D3 and the direction D5 is smaller than the first angle formed by the initial alignment direction D1 of the liquid crystal molecules and the extending direction D5 of electrodes 12.

Because the direction D3 of the absorption axis of the third polarization region 138 of the first polarization layer 13 is different from the initial alignment direction D1 of the liquid crystal molecules, and the third angle formed by the direction D3 of the absorption axis of the third polarization region 138 and the extending direction D5 of the electrodes 12 is smaller than the first angle formed by the initial alignment direction D1 of the liquid crystal molecules and the extending direction D5 of the electrodes 12, the initial state of the entire second region is not set to the dark mode. Therefore, a preset voltage $V_0$ is required to be applied on the electrodes 12 in the entire second region in order to drive the second region into the dark mode. Further, in addition to the preset voltage $V_0$, an extra driving voltage V may be applied on the electrodes 12 to drive the second region into the bright mode. That is, the driving voltage of the second region is $V_0+V$. Therefore, the second region of the liquid crystal display panel 200 has a relatively large driving voltage, thus the rise time may be reduced, leading to an improved response speed.

Moreover, in the first region, because the direction of the absorption axis of the first polarization region 136 coincides with the initial alignment direction D1 of the liquid crystal molecules, the initial state of the first region is the dark mode and no additional preset voltage $V_0$ is required. That is, the driving voltage of the first region is V. Therefore, the rise time and the response speed remain unchanged.

The disclosed liquid crystal display panel and the liquid crystal display device of the present disclosure may have the following advantages: first, by increasing the driving voltage of the second region, the response speed of the second region is improved; second, driving voltage in only part of the region, instead of the entire region, of the liquid crystal display panel and the liquid crystal display device is increased, thus the energy consumption remains low; and, finally, because of the use of the regionalized polarization layers, the liquid crystal display panel and the liquid crystal display device may also have 3D display functions.

Thus, in the liquid crystal display panel and the liquid crystal display device of the present disclosure, because the alignment direction of at least one polarization region is different from the initial alignment direction of the liquid crystal molecules, the initial state of the second polarization region is not in a dark mode. A preset voltage $V_0$ applied on the electrode of the entire second polarization region is required to achieve a dark mode. Further, in addition to the preset voltage $V_0$, a driving voltage V is required to achieve a bright mode in the second region. Therefore, the response speed of the second region is improved. Moreover, because of the use of the regionalized polarization layers, the liquid crystal display panel and the liquid crystal display device of the present disclosure may also have 3D display functions.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:

1. A liquid crystal display panel, comprising:
   a first polarization layer;
   a second polarization layer arranged corresponding to the first polarization layer; and
   a liquid crystal layer formed between the first polarization layer and the second polarization layer, wherein:
      an initial alignment direction of liquid crystal molecules in the liquid crystal layer extends along a first direction;
      at least one first region and at least one second region are defined in the first polarization layer and the second polarization layer, wherein the at least one first region and the at least one second region defined in the first polarization layer are coplanar, and the at least one first region and the at least one second region defined in the second polarization layer are coplanar;
      an absorption axis of the first polarization layer in the at least one first region extends along the first direction and an absorption axis of the second polarization layer in the at least one first region is perpendicular to the absorption axis of the first polarization layer in the at least one first region;
      an absorption axis of the first polarization layer in the at least one second region extends along a second direction, and an absorption axis of the second polarization layer in the at least one second region is perpendicular to the absorption axis of the first polarization layer in the at least one second region; and
      a first angle between the first direction and the second direction is greater than 0 degree but less than 90 degrees.

2. The liquid crystal display panel according to claim 1, further including:
   a thin-film transistor (TFT) substrate having a first substrate and a plurality of electrodes arranged in parallel and spaced on a surface of the first substrate.

3. The liquid crystal display panel according to claim 2, wherein the plurality of electrodes are in a format of single domain, double domain, or pseudo-double domain.

4. The liquid crystal display panel according to claim 2, wherein: the plurality of electrodes extend along an extending direction; and a second angle formed by the extending direction of the plurality of electrodes and the first direction is greater than 0 degree but less than 15 degrees.

5. The liquid crystal display panel according to claim 4, wherein a third angle formed by the extending direction of the plurality of electrodes and the second direction is greater than the second angle.

6. The liquid crystal display panel according to claim 4, wherein the liquid crystal molecules in the liquid crystal layer have a positive dielectric anisotropy.

7. The liquid crystal display panel according to claim 2, wherein the electrodes extend along an extending direction; and a fourth angle formed by the extending direction of the plurality of electrodes and the first direction is greater than 75 degrees but less than 90 degrees.

8. The liquid crystal display panel according to claim 7, wherein a fifth angle formed by the extending direction of the plurality of electrodes and the second direction is smaller than the fourth angle.

9. The liquid crystal display panel according to claim 7, wherein the liquid crystal molecules in the liquid crystal layer have a negative dielectric anisotropy.

10. The liquid crystal display panel according to claim 1, wherein both the first polarization layer and the second polarization layer include a base material and a polarizing material doped into the base material.

11. The liquid crystal display panel according to claim 10, wherein the polarizing material includes a dichroic organic dye.

12. The liquid crystal display panel according to claim 11, wherein the dichroic organic dye is one or more of azo dye, anthraquinone dye, biphenyl dye, triphenyl dioxazine dye and derivatives, single-methine dye, multi-methine dye, and poly ring dye.

13. The liquid crystal display panel according to claim 10, wherein the base material is one or more of cellulose triacetate, polyimide, and polyamide acid.

14. A liquid crystal display device containing a liquid crystal display panel according to claim 1.

15. A liquid crystal display panel, comprising:
a first polarization layer;
a second polarization layer arranged corresponding to the first polarization layer; and
a liquid crystal layer formed between the first polarization layer and the second polarization layer, wherein:
an initial alignment direction of liquid crystal molecules in the liquid crystal layer extends along a first direction;
at least one first region and at least one second region are defined in the first polarization layer and the second polarization layer, wherein the at least one first region and the at least one second region defined in the first polarization layer are coplanar, and the at least one first region and the at least one second region defined in the second polarization layer are coplanar;
an absorption axis of the first polarization layer in the at least one first region extends along a second direction, and an absorption axis of the second polarization layer in the at least one first region is perpendicular to the absorption axis of the first polarization layer in the at least one first region;
a first angle formed by the first direction and the second direction is greater than 0 degree but smaller than 90 degrees;
an absorption axis of the first polarization layer in the at least one second region extends along a third direction, and an absorption axis of the second polarization layer in the at least one second region is perpendicular to the absorption axis of the first polarization layer in the at least one second region; and
a second angle formed by the third direction and the second direction is greater than 0 degree but less than 90 degrees.

16. The liquid crystal display panel according to claim 15, further including:
a thin-film transistor (TFT) substrate having a first substrate and a plurality of electrodes arranged in parallel and spaced on a surface of the first substrate.

17. The liquid crystal display panel according to claim 16, wherein the plurality of electrodes are in a format of single domain, double domain, or pseudo-double domain.

18. The liquid crystal display panel according to claim 15, wherein both the first polarization layer and the second polarization layer include a base material and a polarizing material doped into the base material.

19. A liquid crystal display device containing a liquid crystal display panel according to claim 15.

* * * * *